(12) United States Patent
Shin et al.

(10) Patent No.: US 8,049,699 B2
(45) Date of Patent: Nov. 1, 2011

(54) LIQUID CRYSTAL DISPLAY APPARATUS HAVING STORAGE ELECTRODES OVERLAPPING ONLY SOME SUB-PIXELS

(75) Inventors: Ae Shin, Suwon (KR); Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1008 days.

(21) Appl. No.: 11/349,301

(22) Filed: Feb. 7, 2006

(65) Prior Publication Data

US 2006/0192739 A1    Aug. 31, 2006

(30) Foreign Application Priority Data

Feb. 7, 2005    (KR) .................. 10-2005-0011488
Oct. 25, 2005    (KR) .................. 10-2005-0100702

(51) Int. Cl.
     *G09G 3/36*      (2006.01)
(52) U.S. Cl. ....................................... 345/90
(58) Field of Classification Search ............ 345/87–104; 349/41–47, 39, 144, 82
See application file for complete search history.

(56) References Cited

U.S. PATENT DOCUMENTS

| | | | | |
|---|---|---|---|---|
| 2002/0180901 A1* | 12/2002 | Kim | .................. | 349/43 |
| 2004/0001167 A1* | 1/2004 | Takeuchi et al. | .............. | 349/38 |
| 2004/0012554 A1* | 1/2004 | Song et al. | ................. | 345/92 |
| 2004/0085272 A1* | 5/2004 | Ting et al. | ................. | 345/87 |
| 2005/0024572 A1* | 2/2005 | Tak | ............... | 349/143 |
| 2005/0036091 A1* | 2/2005 | Song | ............... | 349/129 |
| 2005/0078263 A1* | 4/2005 | Kim et al. | ............... | 349/144 |
| 2005/0094078 A1* | 5/2005 | Kang | ............... | 349/141 |
| 2005/0122457 A1* | 6/2005 | Song | ............... | 349/129 |
| 2005/0286003 A1* | 12/2005 | Lee et al. | ............... | 349/141 |
| 2006/0028590 A1* | 2/2006 | Shin et al. | ............... | 349/38 |
| 2006/0066797 A1* | 3/2006 | Baek | ............... | 349/139 |
| 2006/0087598 A1* | 4/2006 | Lee et al. | ............... | 349/41 |

FOREIGN PATENT DOCUMENTS

| | | |
|---|---|---|
| CN | 1469175 | 1/2004 |
| CN | 1469176 | 1/2004 |
| CN | 1495476 | 5/2004 |

* cited by examiner

*Primary Examiner* — Chanh Nguyen
*Assistant Examiner* — Robert Stone
(74) *Attorney, Agent, or Firm* — Cantor Colburn LLP

(57) ABSTRACT

A liquid crystal display apparatus includes a plurality of pixel electrodes arrayed in a matrix, each pixel electrode of the plurality of pixel electrodes having first and second sub-pixel electrodes. The apparatus further includes a plurality of first switching devices connected to the first sub-pixel electrodes, a plurality of gate lines connected to the switching devices, a plurality of data lines connected to the first devices and passing between the pixel electrodes to transmit data voltages, and first and second storage electrodes disposed between the pixel electrodes and the data lines disposed at both sides of the pixel electrodes and overlapping the first sub-pixel electrodes.

18 Claims, 9 Drawing Sheets

LIQUID CRYSTAL DISPLAY APPARATUS HAVING STORAGE ELECTRODES OVERLAPPING ONLY SOME SUB-PIXELS

This application claims priority to Korean Patent Applications No. 2005-0011488, filed on Feb. 7, 2005, and No. 2005-0100702, filed on Oct. 25, 2005, both in the Korean Intellectual Property Office, and all the benefits accruing therefrom under 35 U.S.C. §119, and the contents of which in their entirety are herein incorporated by reference.

BACKGROUND OF THE INVENTION (a) Field of the Invention

The present invention relates to a liquid crystal display apparatus. More particularly, the present invention relates to a liquid crystal display apparatus capable of achieving high resolution by enhancing a space utilizing efficiency.

(b) Description of the Related Art

A liquid crystal display apparatus, which is prominently used in flat panel display apparatuses, includes two panels having electric field generating electrodes such as pixel electrodes and a common electrode and a liquid crystal layer interposed therebetween. The liquid crystal display apparatus displays an image by applying a voltage to the electric field generating electrodes to generate an electric field in the liquid crystal layer. A magnitude off the electric field determines an alignment of liquid crystal molecules in the liquid crystal layer to control polarization of incident light.

A liquid crystal display apparatus with a vertical alignment mode has liquid crystal molecules arranged such that major axes of the liquid crystal molecules are perpendicular to the upper and lower panels when no electric field is generated. Such liquid crystal display apparatuses with a vertical alignment mode have attracted recent attention, since they provide a high contrast ratio and a wide reference viewing angle. Here, the reference viewing angle denotes a viewing angle corresponding to a contrast ratio of 1:10 or a limited angle for brightness inversion between gray voltages.

Forming cut portions in and/or forming protrusions on the electric field generating electrodes are current means for implementing the wide viewing angle in the liquid crystal display apparatus with a vertical alignment mode. Since the cut portions and the protrusions can determine tilt directions of liquid crystal molecules, the tilt directions of the liquid crystal molecules can be variously distributed by using the cut portions and the protrusions, so that the wide viewing angle can be secured.

However, there is a problem in that side visibility deteriorates in comparison to front visibility of the liquid crystal display apparatus with a vertical alignment mode. For example, images of side portions of a liquid crystal display apparatus with a vertically aligned pattern provided with cut portions become brighter. In more severe cases, the brightness difference between high gray voltages disappears and a distorted image may be displayed.

Methods proposed to solve these problems include providing different transmittances by dividing one pixel into two sub-pixels, coupling the two sub-pixels in a capacitive manner, and providing different voltages to the two sub-pixels by directly applying a first voltage to one sub-pixel and a reduced second voltage relative to the first voltage to the other sub-pixel due to capacitive coupling.

However, use of the above proposed methods results in the generation of parasite capacitance between the pixel electrodes and the data lines, resulting in various defects, such as vertical specks and stitch defects. In particular, the defects in a normally black type of liquid crystal display apparatus are more dominant than those in a normally white type.

In order to solve the above noted problems, a method for providing storage electrodes between the data lines and the pixel electrodes has been proposed.

However, in cases where such storage electrodes are employed in a liquid crystal display apparatus having the aforementioned two sub-pixels, which are divided as left and right sub-pixels, the storage capacitances of the two sub-pixels are not uniform and are different from each other due to alignment variation. Therefore, kick-back voltages and charging ratios become different, that may result in defects such as flicker, latent images and specks to occur.

BRIEF SUMMARY OF THE INVENTION

The above discussed and other drawbacks and deficiencies are overcome or alleviated by a liquid crystal display apparatus according to the present invention described herein below.

According to exemplary embodiments of the present invention, a liquid crystal display apparatus includes: a plurality of pixel electrodes arrayed in matrix, each pixel electrode of the plurality of pixel electrodes having first and second sub-pixel electrodes; a plurality of first switching devices connected to the first sub-pixel electrodes; a plurality of gate lines connected to the switching devices; a plurality of data lines connected to the first devices and passing between the pixel electrodes to transmit data voltages; and first and second storage electrodes disposed between the pixel electrodes and the data lines disposed at both sides of the pixel electrodes and overlapping the first sub-pixel electrodes.

In the above exemplary embodiment, the first sub-pixel electrodes may have first and second boundary lines disposed on the first and second storage electrodes, and the first sub-pixel electrodes may be surrounded by the second sub-pixel electrodes.

In addition, the liquid crystal display apparatus may further include third storage electrodes which overlap the second sub-pixel electrodes and that do not overlap the first sub-pixel electrodes. The apparatus may also include conductive members connected to the second sub-pixel electrodes and overlapping the third storage electrodes, wherein a distance between the conductive members and the third storage electrodes is smaller than a distance between the conductive members and the second sub-pixel electrodes. The conductive members may have a pair of boundary lines disposed on the third storage electrodes and facing each other.

The liquid crystal display apparatus may further include second switching devices connected to the second sub-pixel electrodes, the gate lines and the data lines, wherein a magnitude of the data voltages applied to the first and second sub-pixel electrodes of each of the pixels are different from each other and are obtained from the same image information. The data voltages applied to the second sub-pixel electrodes may be larger than the data voltages applied to the first sub-pixel electrodes with respect to a predetermined voltage, the data voltages may be applied to the second sub-pixel electrodes after the data voltages to the first sub-pixel electrodes have been applied and terminated, and an area of each of the first sub-pixel electrodes may be larger than an area of each of the second sub-pixel electrodes.

The liquid crystal display apparatus may further include third storage electrodes which overlap the second sub-pixel electrodes and do not overlap the first sub-pixel electrodes.

The second switching devices may have gate electrodes connected to the gate lines, source electrodes connected to the data lines and drain electrodes connected to the second subpixel electrodes. The drain electrodes may have enlarged portions which overlap the third storage electrodes, and a distance between the enlarged portions and the third storage electrodes may be less than a distance between the enlarged portions and the second sub-pixel electrodes. The enlarged portions of the drain electrodes may have a pair of boundary lines disposed on the third storage electrodes and facing each other.

The first and second sub-pixel electrodes may be capacitively coupled to each other. The first switching devices may have the gate electrodes connected to the gate lines, source electrodes connected to the data lines, and drain electrodes connected to the first sub-pixel electrodes. The drain electrodes may have coupling electrodes which overlap the second sub-pixel electrodes. Voltages induced at the second sub-pixel electrodes due to the capacitive coupling may be lower than the voltages of the first sub-pixel electrodes with respect to a predetermined voltage, and an area of each of the second sub-pixel electrodes may be larger than an area of each of the first sub-pixel electrodes. Further, each of the first and second sub-pixel electrodes may not overlap the respective gate line connected thereto.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
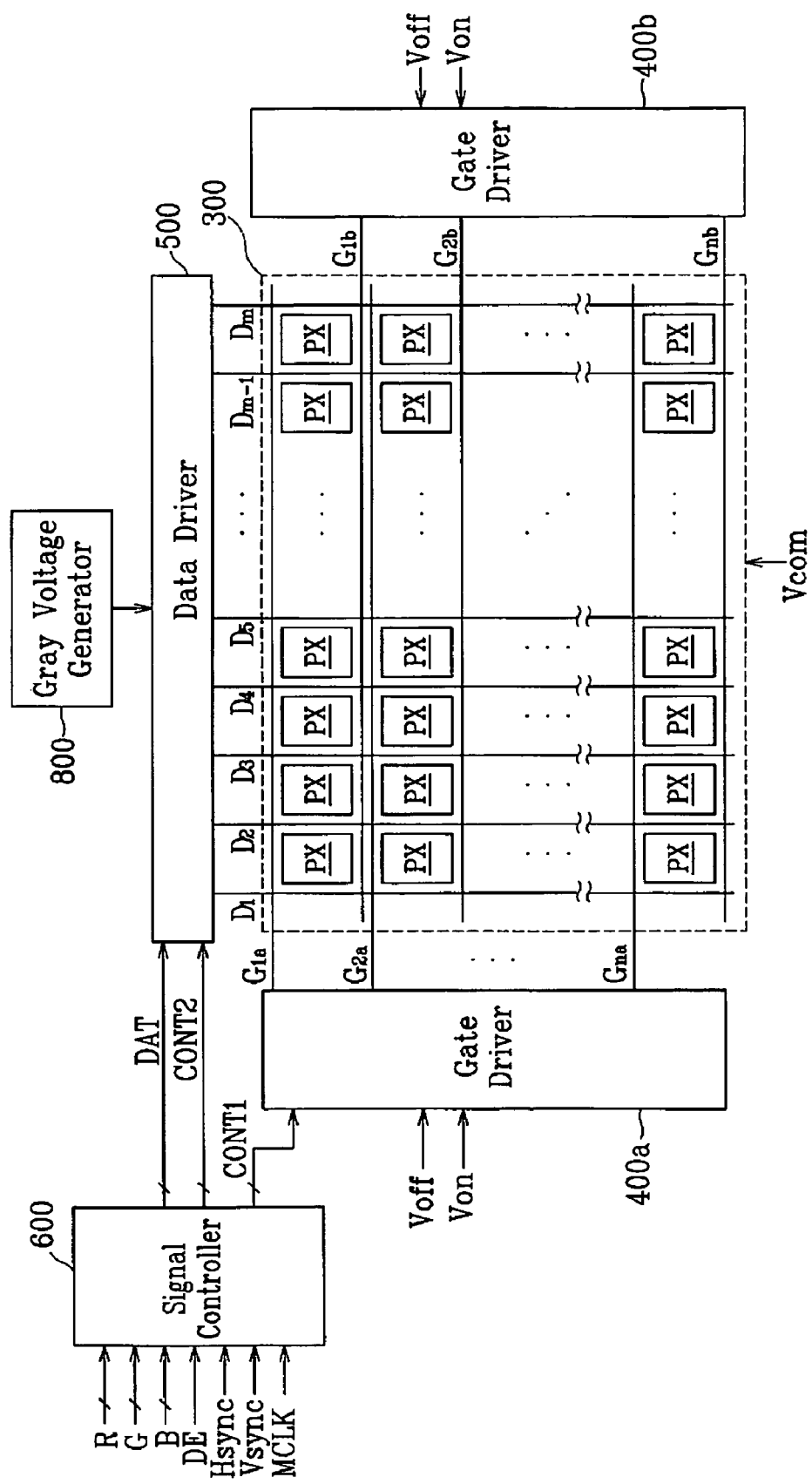
FIG. 1 is a block diagram showing an exemplary embodiment of a liquid crystal display apparatus according to the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
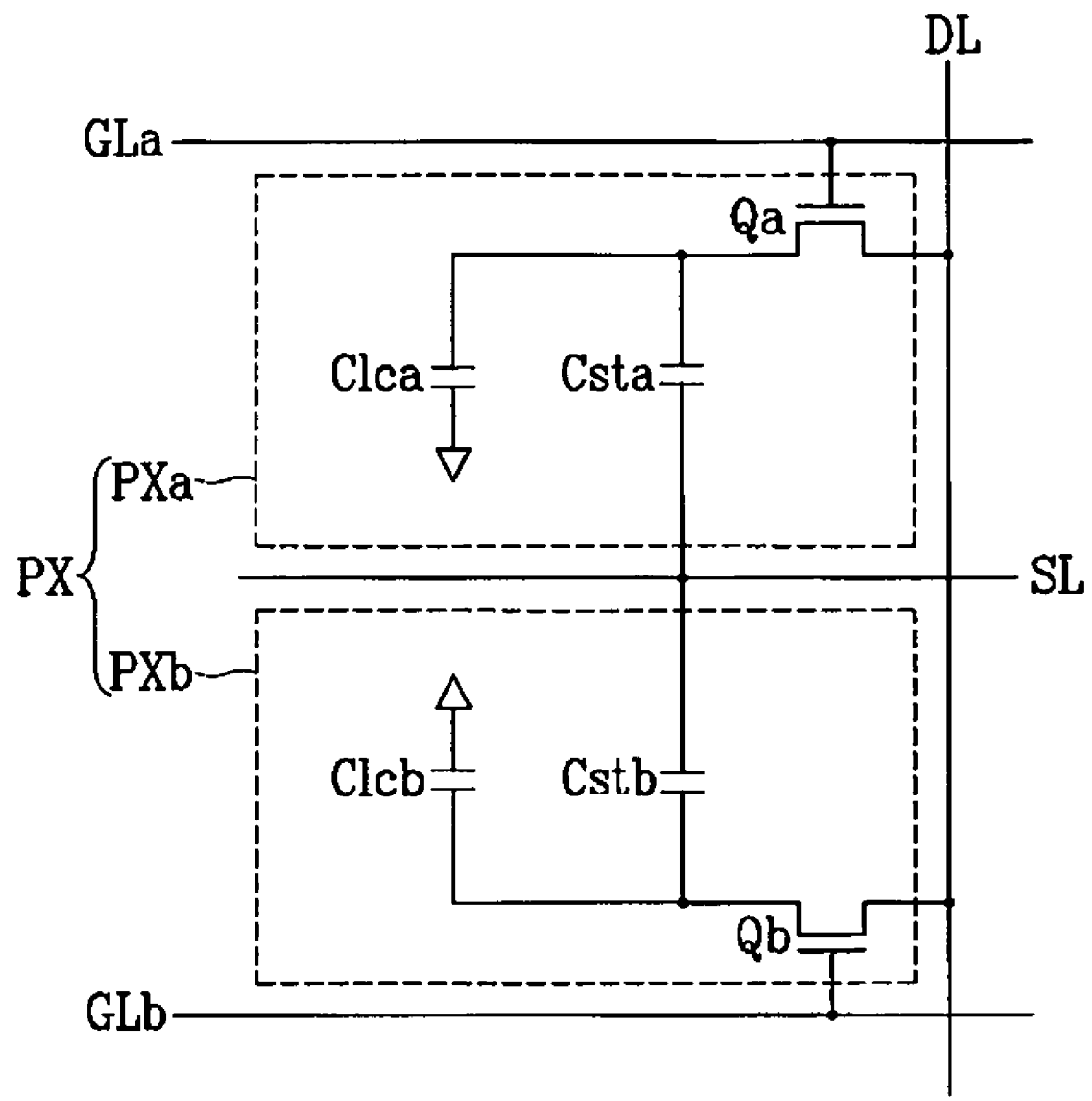
FIG. 2 is an equivalent circuit schematic diagram showing an exemplary embodiment of a pixel of the liquid crystal display apparatus according to the present invention.
Figure 3:
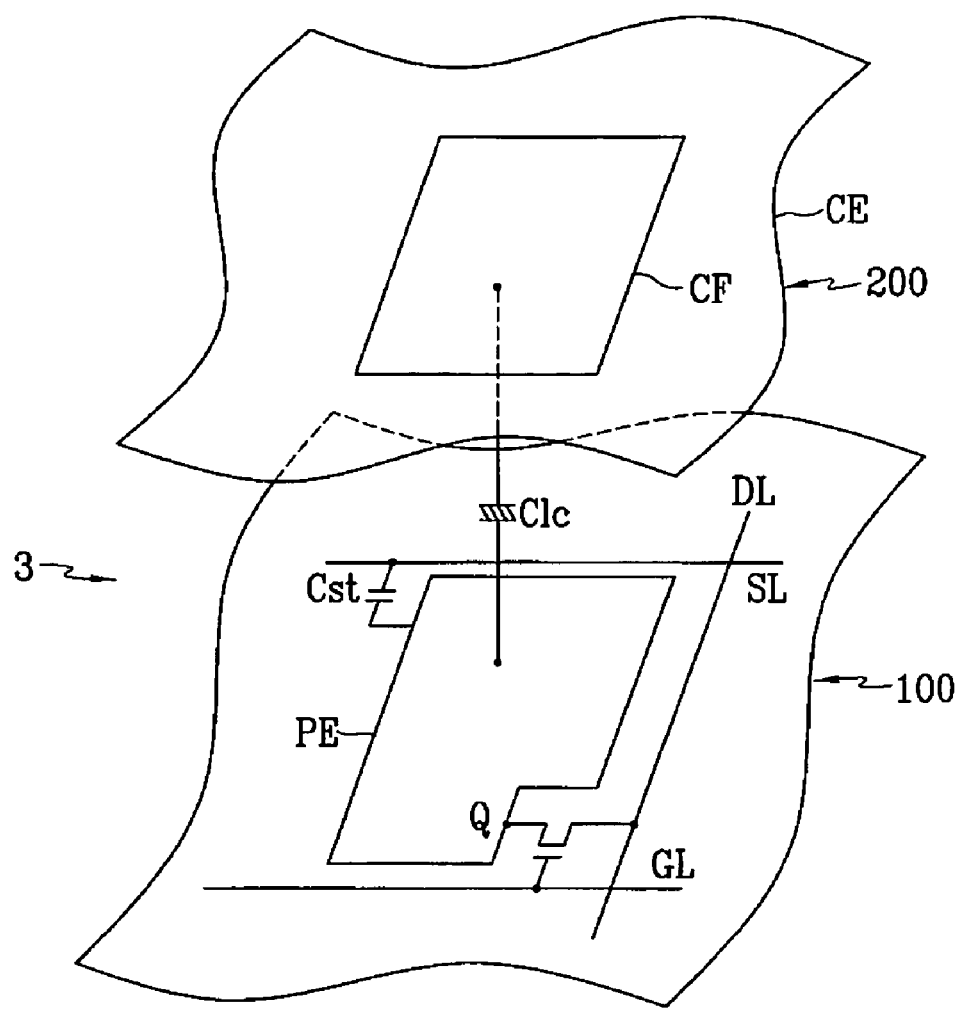
FIG. 3 is an equivalent circuit schematic diagram showing an exemplary embodiment of a sub-pixel of the liquid crystal display apparatus according to the present invention.

FIG. 1 is a block diagram showing an exemplary embodiment of a liquid crystal display apparatus according to the present invention. FIG. 2 is an equivalent circuit schematic diagram showing an exemplary embodiment of a pixel of the liquid crystal display apparatus according to the present invention. FIG. 3 is an equivalent circuit schematic diagram showing an exemplary embodiment of a sub-pixel of the liquid crystal display apparatus according to the embodiment of the present invention.

As shown in FIG. 1, the exemplary embodiment of the liquid crystal display apparatus according to the present invention includes a liquid crystal display panel assembly 300, a pair of gate drivers 400a and 400b and a data driver 500 connected to the liquid crystal display panel assembly 300, a gray voltage generator 800 connected to the data driver 500, and a signal controller 600 for controlling the above enumerated components.

As seen in the block diagram, the liquid crystal display panel assembly 300 includes a plurality of pixels PX which are connected to a plurality of display signal lines and arrayed substantially in a matrix. On the other hand, as shown in FIG. 3, the liquid crystal display panel assembly includes lower and upper panels 100 and 200, respectively, facing each other and a liquid crystal layer 3 interposed therebetween.

The display signal lines include a plurality of gate lines $G_{1a}$ to $G_{nb}$ for transmitting gate signals (sometimes referred to as "scan signals") and a plurality of data lines $D_1$ to $D_m$ for transmitting data signals. The gate lines $G_{1a}$ to $G_{nb}$ extend parallel to each other substantially in a row direction, and the data lines $D_1$ to $D_m$ extend parallel to each other substantially in a column direction, as illustrated in FIG. 1.

In the equivalent circuit schematic diagram showing the display signal line DL and pixels PX of FIG. 2 (only one shown of each), in addition to the gate lines denoted by reference numerals GLa to GLb and the data lines denoted by reference numeral DL, the display signal lines include storage electrode lines SL (only one shown) which extend substantially parallel to the gate lines $G_{1a}$ to $G_{nb}$.

Still referring to FIG. 2, each of the pixels PX includes a pair of sub-pixels PXa and PXb. The sub-pixels PXa and PXb include switching devices Qa and Qb connected to the corresponding gate lines GLa and GLb, respectively, and data lines DL. Liquid crystal capacitors $C_{LC}a$ and $C_{LC}b$ and storage capacitors $C_{ST}a$ and $C_{ST}b$ are connected to the switching devices Qa and Qb, respectively, and storage electrode lines SL. The storage capacitors $C_{ST}a$ and $C_{ST}b$ may be omitted as needed, in which case, the storage electrode lines SL are also omitted.

As shown in FIG. 3, the switching devices Q of the sub-pixels PXa and PXb are constructed with thin film transistors and the like, and are disposed at the upper panel 100. Each of the switching devices Q is a three-port device having a control port connected to the gate line GL, an input port connected to the data line DL and an output port connected to the liquid crystal capacitor $C_{LC}$ and the storage capacitor $C_{ST}$.

Two ports of the liquid crystal capacitor $C_{LC}$ include a sub-pixel electrode PE of the lower panel 100 and a common electrode CE of the upper panel 200. The liquid crystal layer 3 interposed between the two electrodes PE and CE serves as a dielectric member. The sub-pixel electrode PE is connected to the switching device Q, and the common electrode CE is disposed at the upper panel 200 to receive a common voltage $V_{com}$.

The storage capacitor $C_{ST}$ having an auxiliary function for the liquid crystal capacitor $C_{LC}$ is constructed by overlapping the sub-pixel electrode lines SL and the sub-pixel electrode PE provided to the lower panel 100 with an insulating member interposed therebetween. A predetermined voltage, such as a common voltage $V_{com}$, is applied to the storage electrode line SL. However, alternatively, the storage capacitor $C_{ST}$ may be constructed by overlapping the sub-pixel electrode PE and a front gate line disposed above with an insulating member interposed therebetween.

On the other hand, in order to implement a color display, each of the pixels uniquely displays one of various or primary colors (spatial division), or each of the pixels alternately displays the various or primary colors according to time (time division). A desired color can then be obtained by a spatial or time combination of the primary colors. An example of the various colors includes one of three colors such as red, green, and blue, and may also be primary colors. FIG. 3 shows an example of spatial division. As shown in the figure, each of the pixels includes a color filter CF for representing one of the various or primary colors, which is provided to a region of the upper panel 200. Unlike that illustrated in FIG. 3, the color filter CF may be provided above or below the sub-pixel electrode PE of the lower panel 100.

As shown in FIG. 1, the gate drivers 400a and 400b are connected to the gate lines $G_{1a}$ to $G_{nb}$ to apply gate signals formed in a combination of a gate-on voltage $V_{on}$ and a gate-off voltage $V_{off}$ to the gate lines $G_{1a}$ to $G_{nb}$. In FIG. 1, the gate drivers 400a and 400b are respectively disposed at left and right sides of the liquid crystal display panel assembly 300 to be respectively connected to odd-numbered and even-numbered gate lines $G_{1a}$ to $G_{nb}$. In some cases, a single gate driver may be provided to apply all of the gate signals.

The gray voltage generator 800 generates two gray voltage sets (e.g., reference grayscale sets) corresponding to a transmittance of the pixels. Two gray voltage sets are independently applied to the two sub-pixels constituting one pixel. Each gray voltage set includes a gray voltage set having a positive value with respect to the common voltage $V_{com}$ and a gray voltage set having a negative value with respect to the common voltage $V_{com}$. However, instead of the two (reference) gray voltage sets, only a single (reference) gray voltage set may be generated.

The data driver 500 is connected to the data lines $D_1$ to $D_m$ of the liquid crystal display panel assembly 300 to select one of the two gray voltage sets of the gray voltage generator 800 and apply one gray voltage of the selected gray voltage set to the pixel as a data signal. Alternatively, in a case where the gray voltage generator 800 generates the reference gray voltages instead of all of the gray voltages, the data driver 500 generates the gray voltages by dividing the reference gray voltages and selects the data voltage among the generated gray voltages.

The gate drivers 400a and 400b or the data driver 500 may be directly mounted in a form of a plurality of driving integrated chips ("ICs") on the liquid crystal display panel assembly 300, or they may be attached in a form of a tape carrier package ("TCP") on a flexible printed circuit ("FPC") film (not shown) in the liquid crystal display panel assembly 300. Alternatively, the gate drivers 400a and 400b or the data driver 500 together with the display signal lines $G_{1a}$ to $G_{nb}$ and $D_1$ to $D_m$ and the thin film transistor switching devices Q may be directly mounted on the liquid crystal display panel assembly 300.

The signal controller 600 controls operations of the gate drivers 400a and 400b, the data driver 500, and the like.

Now, an example of the aforementioned liquid crystal display panel assembly will be described in detail with reference to FIGS. 4 to 6.

Figure 4:
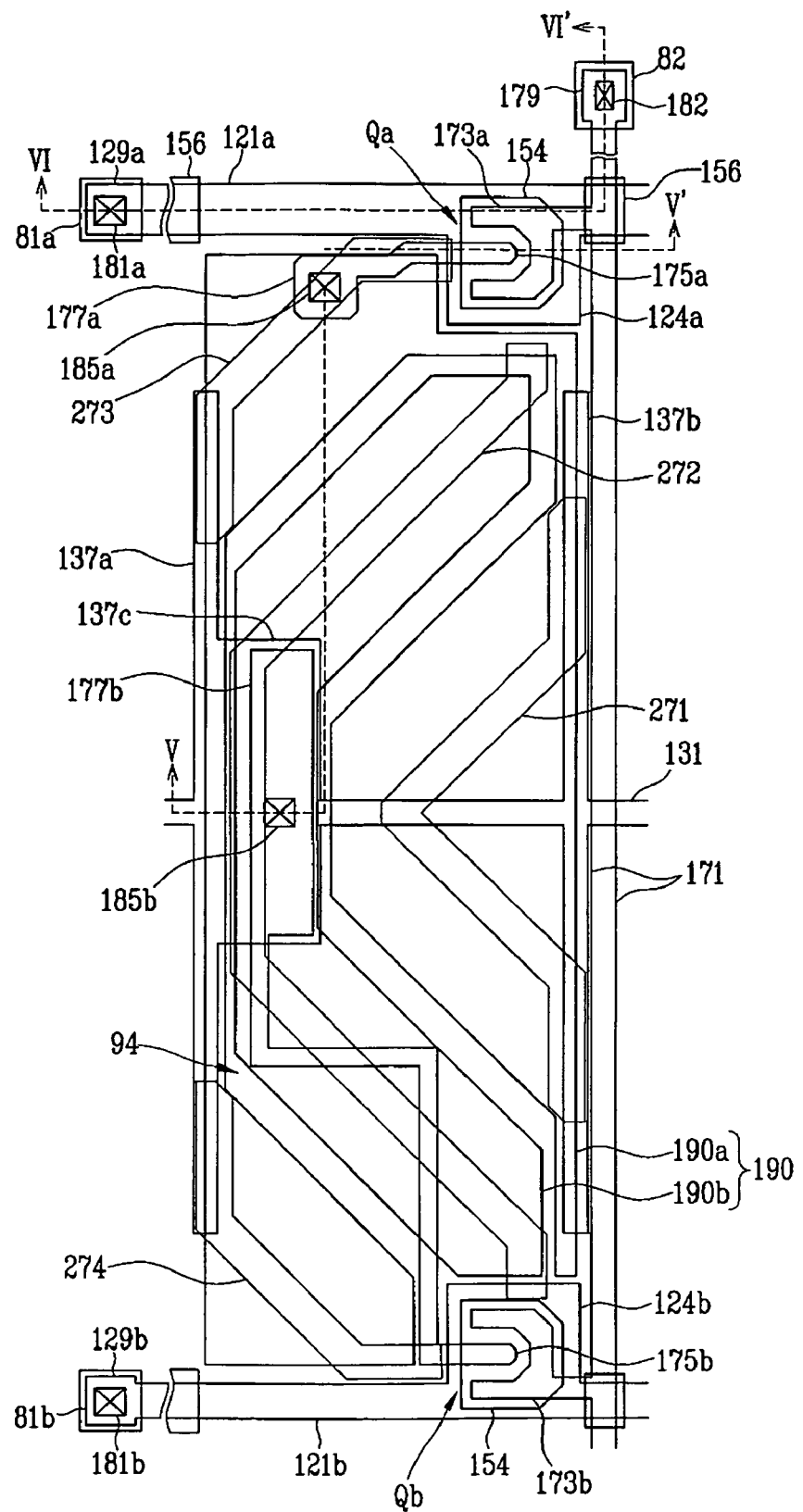
FIG. 4 is a plan view showing an exemplary embodiment of a layout of the liquid crystal display apparatus according to the present invention.

FIG. 4 is a plan view showing an exemplary embodiment of a layout of the liquid crystal display apparatus according to the present invention. FIGS. 5 and 6 are cross-sectional views showing the liquid crystal panel assembly taken along lines V-V' and VI-VI' of FIG. 4, respectively.

Figure 5:
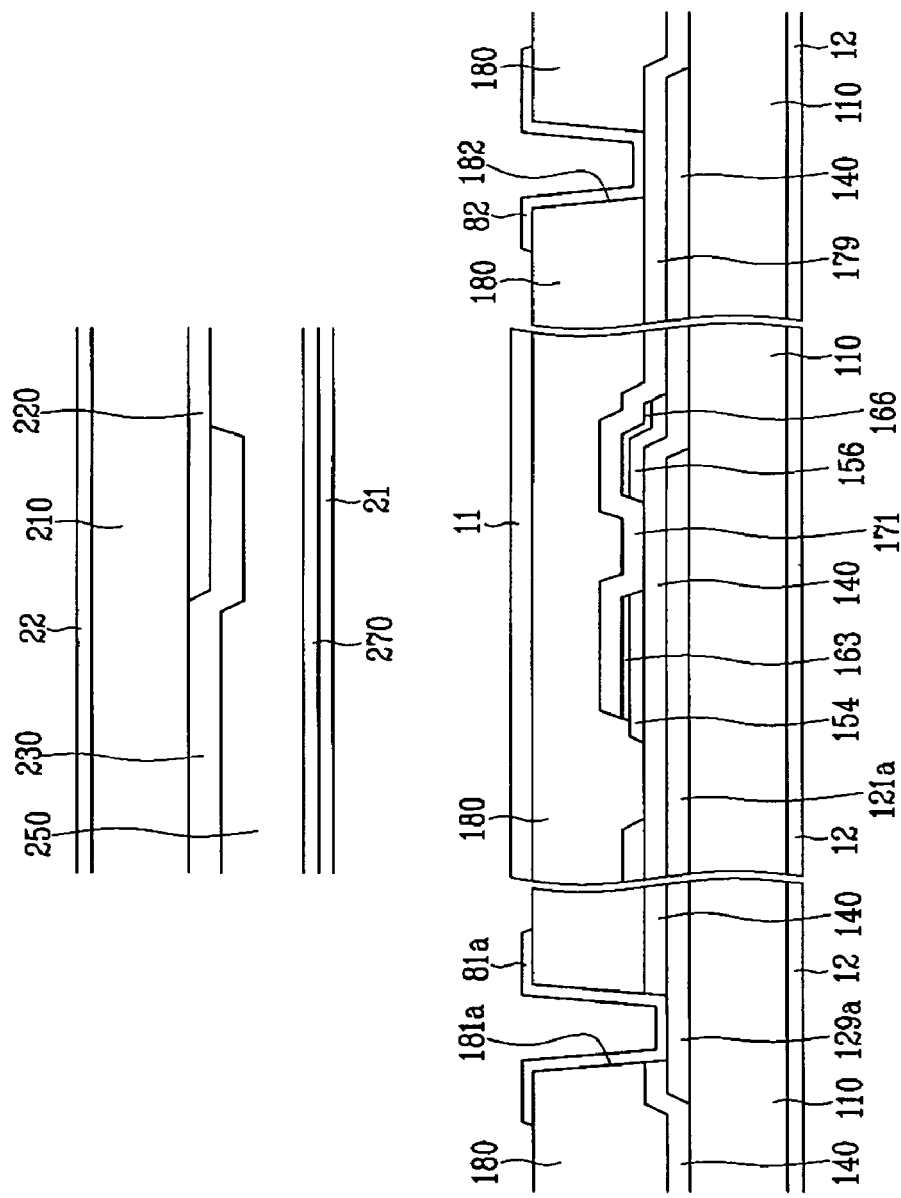
FIGS. 5 and 6 are cross-sectional views showing the liquid crystal panel assembly taken along lines V-V' and VI-VI' of FIG. 4, respectively.
Figure 6:
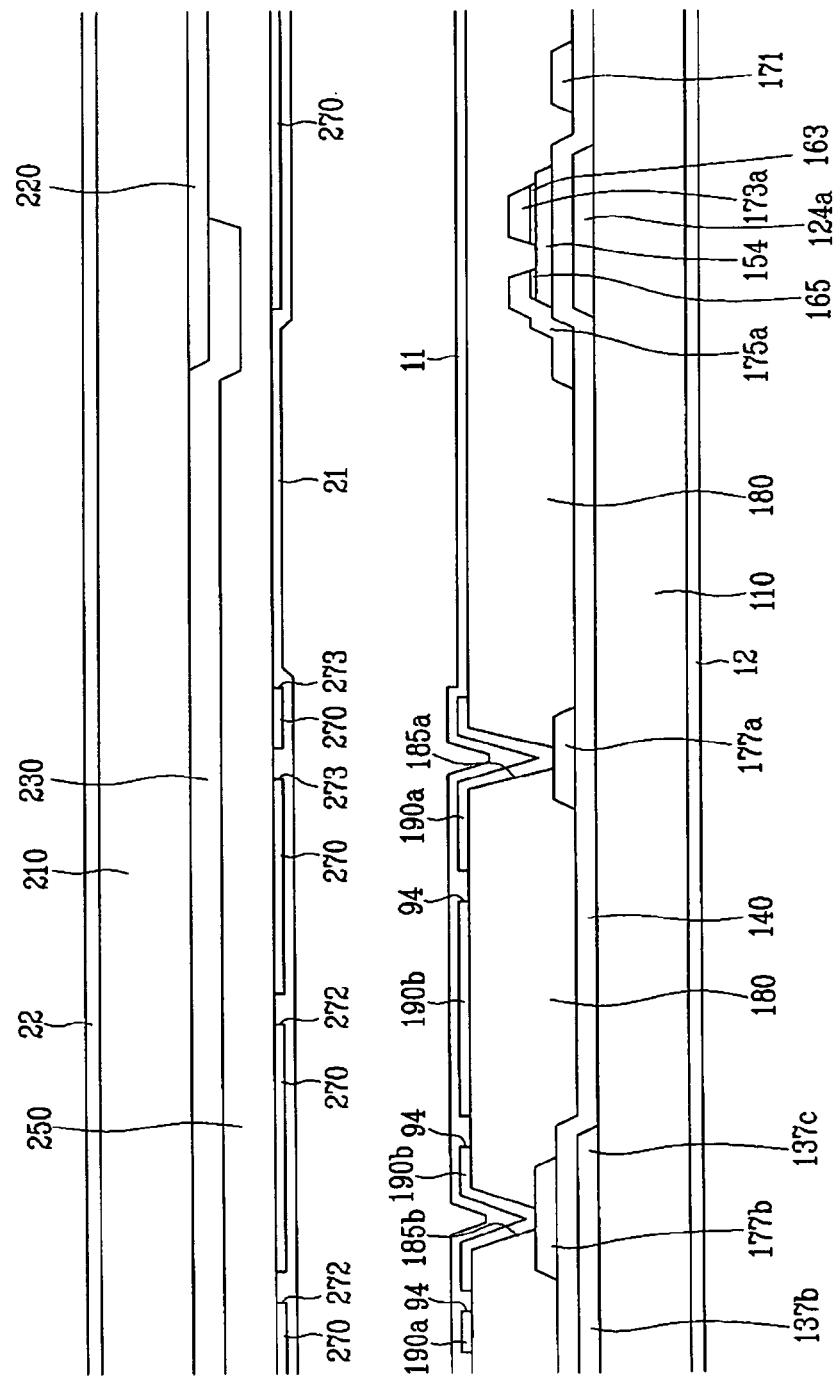

Referring to FIGS. 4 to 6, the liquid crystal display panel assembly 300 includes the lower panel 100, the upper panel 200 facing the lower panel 100 and the liquid crystal layer 3 interposed therebetween.

Firstly, the lower panel 100 will be described in detail.

A plurality of first and second gate lines 121a and 121b, respectively, and a plurality of storage electrode lines 131 are disposed on a dielectric substrate 110 made of a transparent glass or the like.

The gate lines 121a and 121b mainly extend in a longitudinal direction, as illustrated, and are physically and electrically separated from each other to transmit respective gate signals. The first and second gate lines 121a and 121b disposed in upper and lower sides include a plurality of first and second gate electrodes 124a and 124b protruding from first and second gate lines 121a and 121b, respectively, and towards each other, as illustrated in FIG. 4. The gate lines 121a and 121b include a plurality of end portions 129a and 129b disposed at left and right sides, respectively. The end portions 129a and 129b have a wide area for connection to other layers or external apparatuses.

The storage electrode lines 131 mainly extend in the longitudinal direction, as illustrated in FIG. 4. A distance between the storage electrode lines and the first gate lines 121a is substantially equal to a distance between the storage electrode lines 131 and the second gate lines 121b. Each of the storage electrode lines 131 includes a plurality of pairs of linear-shaped first and second storage electrodes 137a and 137b, respectively, and plate-shaped storage electrodes 137c. The first and second storage electrodes 137a and 137b extend from the storage electrode lines 131 in the up and down directions, as illustrated in FIG. 4. However, shapes and arrangements of the storage electrodes 137a, 137b, and 137c and the storage electrode lines 131 may be modified in various manners.

The gate lines 121 and the storage electrode lines 131 are preferably made of an aluminum-based metal such as aluminum (Al) and an aluminum alloy, a silver-based metal such as silver (Ag) and a silver alloy, a copper-based metal such as copper (Cu) and copper alloy, a molybdenum-based metal such as molybdenum (Mo) and a molybdenum alloy, chromium (Cr), titanium (Ti), or tantalum (Ta), for example. However, the gate lines 121 and the storage electrode lines 131 may have a multi-layered structure including two conductive layers (not shown) each having different physical properties. One of the two conductive layers is made of a metal having a low resistivity, including an aluminum-based metal, a silver-based metal, or a copper-based metal, for example, in order to reduce signal delay or voltage drop of the gate lines 121 and the storage electrode lines 131. The other conductive layers are made of a material having good contact characteristics to other materials, particularly to indium tin oxide (ITO) and indium zinc oxide (IZO), such as a molybdenum-based metal, chromium, titanium, or tantalum, for example. A preferred example of the combination, includes a combination of a lower chromium layer and an upper aluminum layer and a combination of a lower aluminum layer and an upper molybdenum layer. However, the gate lines 121 and the storage electrode lines 131 may be made of various metals and conductive materials.

In addition, side surfaces of the gate lines 121 and the storage electrode lines 131 are slanted or oblique with respect to a surface of the substrate 110. A slant angle of the side surfaces of the gate lines 121 and the storage electrode lines 131 relative to the surface of the substrate 110 is in a range of about 30° to about 80°.

A gate insulating layer 140 made of a silicon nitride $SiN_x$, or the like, is formed on the gate lines 121 and the storage electrode lines 131.

A plurality of island-shaped semiconductors 154 and 156 made of hydrogenated amorphous silicon or polysilicon are formed above the gate insulating layer 140. The island-shaped semiconductors 154 are disposed on the first and second gate electrodes 124a and 124b. The island-shaped semiconductors 156 are disposed on portions of the gate lines 121a and 121b in the vicinity of the gate lines 121.

A plurality of island-shaped ohmic contact members 163, 165 and 166 made of a silicide or n+ hydrogenated amorphous silicon or the like, which are doped with n-type impurities, are formed above the semiconductors 154 and 156.

Side surfaces of the semiconductors 154 and 156 and the ohmic contact members 163, 165, and 166 are also slanted with respect to the surface of the substrate 110, and include a slant angle in a range of about 30° to about 80°.

A plurality of data lines 171 and a plurality of first and second drain electrodes 175a and 175b, respectively, are formed on the ohmic contact members 163 and 165 and the gate insulating layer 140.

The data lines 171 mainly extend in the longitudinal direction to intersect the gate lines 121 and the storage electrode lines 131 and transmit the data voltages thereto, as illustrated in FIG. 4. The first and second storage electrodes 137a and 137b are disposed at the right and left sides, respectively, of the data lines 171 and are separated from the data lines without overlapping them. The data lines 171 have a plurality of first and second source electrodes 173a and 173b which extend toward the first and second drain electrodes 175a and 175b, respectively, and end portions 179 which have enlarged widths relative the data lines 171 for connection to other layers or external apparatuses.

The first drain electrodes 175a have enlarged portions 177a having a large area which extend from bar-shaped end portions on the semiconductors 154. The second drain electrodes 175b have enlarged portions 177b having a large area which extend from the bar-shaped end portions on the semiconductors 154 and overlap the plate-shaped storage electrodes 137c. The entire portions of the enlarged portions 177b of the second drain electrodes 175b are disposed on the plate-shaped storage electrodes 137c. Particularly, it is preferable that the left and right sides of the enlarged portions 177b are separated by a predetermined distance from the left and right sides of the plate-shaped storage electrodes 137c, as illustrated in FIG. 4.

The source electrodes 173a and 173b are curved to surround the bar-shaped end portions of the drain electrodes 175a and 175b. The first and second gate electrodes 124a and 124b, the first and second source electrodes 173a and 173b and the first and second drain electrodes 175a and 175b together with the semiconductors 154 constitute the first and second thin film transistors ("TFTs") Qa and Qb. Channels of the thin film transistors Qa and Qb are formed on the semiconductors 154 between the first and second source electrodes 173a and 173b and the drain electrodes 175a and 175b.

The data lines 171 and the drain electrodes 175a and 175b are preferably made of chromium, a molybdenum-based metal, or a refractory metal such as tantalum or titanium, and may have a multi-layered structure which is constructed with a lower layer (not shown) made of the refractory metal and an upper layer (not shown) made of a low resistance material disposed thereon. As an example of the multi-layered structure, in addition to the aforementioned two-layered layer of a lower chromium or molybdenum layer and an upper aluminum layer, there is a three-layered structure including a molybdenum layer/aluminum layer/molybdenum layer structure.

Similar to the gate lines 121 and the storage electrode line 131, the side surfaces of the data lines 171 and the drain electrodes 175a and 175b are also slanted or oblique having a slant angle ranging from about 30° to about 80°.

The ohmic contact members 163, 165, and 166 are interposed only between the underlying semiconductors 154 and 156 and the overlying data lines 171 and drain electrodes 175a and 175b, and have a function of reducing contact resistance therebetween. The island-shaped semiconductors 154 and 156 and the ohmic contact members 166 are disposed at intersections of the gate lines 121a and 121b and the data lines 171, and the profile of surfaces thereof are smoothed so that disconnection of the data lines 171 can be prevented.

A protective film (e.g., passivation layer) 180 is formed on the data lines 171, the drain electrodes 175a and 175b and the exposed semiconductors 154 and 156. The protective film 180 is made of an inorganic material such as silicon nitride and silicon oxide, an organic material having an excellent planarization property and photosensitivity, or a low dielectric-constant insulating material formed with a plasma enhanced chemical vapor deposition ("PECVD") such as a-Si:C:O or a-Si:O:F. However, in order to use excellent properties of an organic film and protect the exposed portions of the semiconductors 154, the protective film 180 may have a two-layered structure of a lower inorganic film and an upper organic film.

In the protective film 180, a plurality of contact holes 182, 185a and 185b, which expose the end portions 179 of the data lines 171 and the enlarged portions 177a and 177b of the drain electrodes 175a and 175b, respectively, are formed In the protective film 180 and the gate insulating layer 140, a plurality of contact holes 181a and 181b, which expose the end portions 129a and 129b of the gate lines 121a and 121b, respectively, are formed.

On the protective film 180, a plurality of pixel electrodes 190 including a plurality of first and second sub-pixel electrodes 190a and 190b, respectively, and a plurality of contact assistant members 81a, 81b and 82 are formed. The pixel electrodes 190 and the contact assistant members 81 and 82 are made of a transparent conductive material such as ITO, IZO or a reflective conductive material such as aluminum.

The first and second sub-pixel electrodes 190a and 190b are physically and electrically connected through the contact holes 185a and 185b to the first and second drain electrodes 175a and 175b to receive data voltages from the first and second drain electrodes 175a and 175b, respectively.

The sub-pixel electrodes 190a and 190b applied with the data voltages together with a common electrode 270 generate an electric field, so that alignment of the liquid crystal molecules of the liquid crystal layer 3 between the two electrodes 190 and 270 can be determined.

As described above, the sub-pixel electrodes 190a and 190b and the common electrode 270 constitute the liquid crystal capacitors $C_{LC}a$ and $C_{LC}b$ to sustain the applied voltages even though the thin film transistors Qa and Qb are turned off. In order to increase the voltage storage capability, the storage capacitors $C_{STa}$ and $C_{STb}$ connected in parallel to the liquid crystal capacitors $C_{LC}a$ and $C_{LC}b$ are constructed by overlapping the first and second sub-pixel electrodes 190a and 190b and the first and second drain electrodes 175a and 175b connected thereto with the linear-shaped storage electrodes 137a, 137b, and 137c.

Referring to FIG. 4, the first sub-pixel electrodes 190a overlap with the first and second linear-shaped storage electrodes 137a and 137b, and the second sub-pixel electrodes 190b overlap with the plate-shaped storage electrodes 137c and the second drain electrodes 175b. Particularly, left and right sides of the first sub-pixel electrodes 190a are disposed on the first and second linear-shaped storage electrodes 137a and 137b, respectively. As a result, although left and right positional variations of the first sub-pixel electrodes 190a occur with respect to the storage electrodes 137a and 137b, the storage capacitance between the first sub-pixel electrodes 190a and the storage electrodes 137a and 137b is uniform. In addition, as described above, it is preferable that the left and right sides of the enlarged portions 177b of the second drain electrodes 175b are separated by a predetermined distance from the left and right sides of the plate-shaped storage electrodes 137c. As a result, although left and right positional variations of the second drain electrodes 175b occur with respect to the storage electrodes 137c, the storage capacitance between the second drain electrodes 175b and the storage electrodes 137c is uniform. Here, although the storage capacitance is added to by the storage capacitance between the second sub-pixel electrodes 190b and the storage electrodes 137c, the storage capacitance between the second drain electrodes 175b and the storage electrodes 175c is much larger than the storage capacitance between the second sub-pixel electrodes 190b and the storage electrodes 137c, thus allowing the storage capacitance of the second sub-pixel electrodes 190b to be maintained at a substantially uniform value.

A pair of the first and second sub-pixel electrodes 190a and 190b of one pixel electrode 190 are engaged with each other with a gap 94 interposed therebetween, and the second sub-pixel electrode 190b is substantially surrounded by the first sub-pixel electrode 190a. Particularly, the first sub-pixel electrode 190a is interposed between the first and second linear-shaped storage electrodes 137a and 137b and the second sub-pixel electrode 190b.

Each of the first sub-pixel electrodes 190a has a substantially rectangular outer boundary and includes a central portion disposed at the center thereof. The central portion has a shape of a rotated equilateral trapezoid, a pair of edge portions having a shape of a right angled triangle or a right angled trapezoid, a plurality of linear-shaped connection portions for connecting these portions and extension portions. The extension portions of the first sub-pixel electrodes 190a extend from the center thereof along the second linear-shaped storage electrodes 137b in the downward direction, as illustrated in FIG. 4. Each of the second sub-pixel electrodes 190b includes a straight portion disposed at the center thereof and extending in the transverse direction and a pair of slanted portions connected to both ends thereof.

The first and second sub-pixel electrodes 190a and 190b have approximate inversion symmetry with respect to the storage electrode lines 131. Preferably, an area of each of the first sub-pixel electrodes 190a is larger than an area of each of the second sub-pixel electrodes 190b. More preferably, the area of the first sub-pixel electrode 190a is 1.5 times or more than the area of the second sub-pixel electrode 190b in order to ensure visibility.

The first gate lines 121a are disposed above the pixel electrodes 190, and the second gate lines 121b are disposed below the pixel electrodes 190, as illustrated in FIG. 4. The pixel electrodes 190 are separated from the first and second gate lines 121a and 121b without overlapping them.

Shapes of the first and second sub-pixel electrodes 190a and 190b may be modified in various manners.

The contact assistant members 81a, 18b and 82 are connected through the contact holes 181a, 181b and 182 to the end portions 129a and 129b of the gate lines 121a and 121b and the end portions 179 of the data lines 171, respectively. The contact assistant members 81a, 18b and 82 have a function of compensating for adhesiveness of the exposed end portions 129a and 129b of the gate lines 121a and 121b and the exposed end portions 179 of the data lines 171 to external apparatuses, as well as protecting these portions.

As shown in FIG. 1, in a case where the gate drivers 400a and 400b or the data driver 500 are integrated on the liquid crystal display panel assembly 300, the gate lines 121a and 121b or the data lines 171 extend to be directly connected thereto. In this case, the contact assistant members 81a, 81b and 82 may be used to connect the gate lines 121a and 121b or the data lines 171 to the drivers 400a, 400b and 500.

Referring to FIGS. 5 and 6, an alignment film 11 for aligning the liquid crystal layer 3 is coated on the pixel electrodes 190 and the protective film 180.

Now, the upper panel 200 will be described.

A light-shielding member 220, called a black matrix for preventing light leakage, is formed on a dielectric substrate 210 made of transparent glass or the like. The light-shielding member 220 includes a plurality of opening portions, which face the pixel electrodes 190 and have substantially the same shape as the pixel electrodes 190. Alternatively, the light-shielding member 220 may be constructed with portions corresponding to the data lines 171 and portions corresponding to the thin film transistors. However, the light-shielding member 220 may have various shapes in order to prevent light leakage in a vicinity of the pixel electrodes 190 and the thin film transistors Qa and Qb.

A plurality of color filters 230 are formed on the substrate 210. Most portions of the color filters 230 are disposed in a region surrounded by the light-shielding member 220. The color filters 230 extend along the pixel electrodes 190 in the transverse direction relative to FIGS. 4-6. Each of the color filters 230 can display one of three colors such as red, green, and blue colors, and may also be primary colors.

A cover film 250 is formed on the color filters 230 and the light-shielding member 220 in order to prevent the color filters 230 from being exposed and to provide a planarized surface.

A common electrode 270 made of a transparent conductive material such as ITO or IZO is formed on the cover film 250.

The common electrode 270 includes a plurality of cut portion sets 271 to 274 (FIGS. 4 and 6).

One cut portion set of the cut portions 271 to 274 faces one pixel electrode 190 and includes a pair of central cut portions 271 and 272 and upper and lower cut portions 273 and 274, respectively. The central cut portion 271 and the upper and lower cut portions 273 and 274 overlap the first sub-pixel electrode 190a The central cut portion 272 overlaps with the second sub-pixel electrode 190b. Each of the cut portions 271 to 274 is disposed in parallel to the slanted sides of the sub-pixel electrodes 190a and 190b across the sub-pixel electrodes 190a and 190b. Therefore, each of the cut portions 271 to 174 includes at least one slanted portion. One cut portion set of the cut portions 271 to 274 has approximate inversion symmetry with respect to the storage electrode line 131.

The central cut portion 271 includes a pair of slanted portions which extend substantially from the center of the pixel electrode 190 to the right side of the pixel electrode 190 in the slanted or oblique direction and a pair of transverse portions which extend from ends of the slanted portions along the right sides of the pixel electrode 190 with an obtuse angle with respect to the slanted portions and overlap the right side of the pixel electrode 190, as illustrated in FIG. 4.

The central cut portion 272 includes transverse portions which extend substantially from the center of the left side of the pixel electrode 190 in the upward and downward directions and overlap with the storage electrode 271c, as illustrated in FIG. 4. The central cut portion 272 further includes a pair of slanted portions which extend from ends of the transverse portions to the right side of the pixel electrode 190 in the slanted direction, and transverse portions which extend from ends of the slanted portions along the right sides of the second sub-pixel electrode 190b with an obtuse angle with respect to the slanted portions and overlap with the right side of the second sub-pixel electrode 190b.

The number of the cut portions 271 to 274 may vary according to design factors The light-shielding member 220 overlaps the cut portions 271 to 274 to prevent light leakage in a vicinity of the cut portions 271 to 274.

Referring to FIGS. 5 and 6, an alignment film 21 for aligning the liquid crystal molecules is coated on the common electrode 270.

Perpendicular polarizing plates 12 and 22 are provided on outer surfaces of the panels 100 and 200 (FIG. 3). Transmission axes of the two polarizing plates 12 and 22 are perpendicular to each other, and one of the transmission axes (or absorbing axes) is parallel to the longitudinal direction relative to FIG. 4. In the case of a reflective type of liquid crystal display apparatus, one of the two polarizing plates 12 and 22 may be omitted.

The liquid crystal layer 3 has negative anisotropic permittivity, and the liquid crystal molecules are aligned such that major axes thereof are perpendicular to the surfaces of the two panels 100 and 200 when no electric field is applied to the liquid crystal molecules.

When the common voltage and the data voltage are applied to the common electrode 270 and the pixel electrode 190, respectively, an electric field is generated in a direction substantially perpendicular to the surfaces of the panels 100 and 200. The cut portions 94 and 271 to 274 (hereinafter, members denoted by reference numeral 94 are referred to as cut portions for the convenience of description) of the electrodes 190 and 270 distort the electric field to generate a horizontal component, which is perpendicular to the sides of the cut portions 94 and 271 to 274. Accordingly, the electric field is oriented in a direction slanted with respect to a direction perpendicular to the surfaces of the panels 100 and 200. In response to the electric field, the liquid crystal molecules have a tendency to change the major axis direction to be perpendicular to the direction of the electric field. At this time, since the electric field in a vicinity of the cut portions 94 and 271 to 274 and the sides of the pixel electrode 190 has a predetermined angle, which is not parallel to the major axes direction of the liquid crystal molecules, the liquid crystal molecules rotate in such a direction that the moving distance on the surface formed by the major axis direction of the liquid crystal molecules and the electric field is short. Therefore, one group of the cut portions 94 and 271 to 274 and the sides of the pixel electrode 190 divide the region of the liquid crystal layer 3 located on the pixel electrode 190 into a plurality of domains where the liquid crystal molecules have different tilt angles, thereby making it possible to increase a reference viewing angle.

At least one of the cut portions 271 to 274 may be replaced with protrusions (not shown) or recessed portions, and shapes and arrangements of the cut portions 94 and 271 to 274 may be modified in various manners.

A display operation of the liquid crystal display apparatus will now be described in detail below with reference to FIG. 1.

The signal controller 600 receives input image signals R, G, and B and input control signals for controlling a display thereof from an external graphic controller (not shown). As an example of the input control signals, a vertical synchronization signal Vsync, a horizontal synchronization signal Hsync, a main clock signal MCLK and a data enable signal DE are received. The signal controller 600 processes the image signals R, G and B according to an operating condition of the liquid display panel assembly 300 based on the input control signals and the input image signals R, G and B to generate a gate control signal CONT1 and a data control signal CONT2. The signal controller 600 then transmits the generated gate control signal CONT1 to the gate drivers 400a and 400b and the generated data control signal CONT2 and the processed image signal DAT to the data driver 500.

The gate control signal CONT1 includes a scan start signal STV (not shown) for indicating scan starting and at least one clock signal for controlling an output time of the gate-on voltage $V_{on}$. The gate control signal CONT1 may also include an output enable signal OE (not shown) for defining a duration time of the gate-on voltage $V_{on}$.

The data control signal CONT2 includes a horizontal synchronization start signal STH (not shown) for indicating data transmission for a group of pixels PX, a load signal LOAD (not shown) for commanding to apply data voltages to the data lines $D_1$ to $D_m$, and a data clock signal HCLK (not shown). The data control signal CONT2 may include a reverse signal RVS (not shown) for inverting a polarity of the data voltage with respect to the common voltage $V_{com}$ (hereinafter, "the polarity of the data voltage with respect to the common voltage $V_{com}$" being abbreviated to a "data signal polarity").

In response to the data control signal CONT2 from the signal controller 600, the data driver 500 receives the image data DAT for a group of the sub-pixels PX, selects one of the two gray voltage sets from the gray voltage generator 800, and selects a gray voltage corresponding to the image data DAT from the selected gray voltage set, so that the image data DAT is converted into the associated data voltage. The associated data voltage is then applied to the associated data lines $D_1$ to $D_m$.

Alternatively, instead of the data driver 500, an external section circuit (not shown) that is separately provided may select one of the two gray voltage sets and transmit the selected one to the data driver 500. Otherwise, the gray voltage generator 800 may provide a reference voltage having a variable value, and the data driver 500 may divide the reference voltage, so that the gray voltage can be generated.

In response to the gate control signal CONT1 from the signal controller 600, the gate drivers 400a and 400b apply the gate-on voltage $V_{on}$ to the gate lines $G_{1a}$ to $G_{nb}$ to turn on the switching devices Qa and Qb connected to the gate lines $G_{1a}$ to $G_{nb}$. As a result, the data voltages applied to the data lines $D_1$ to $D_m$ are applied to the associated sub-pixels PXa and PXb through the turned-on switching devices Qa and Qb.

A difference between the data voltage applied to the sub-pixels PXa and PXb and the common voltage $V_{com}$ becomes a charge voltage of the liquid crystal capacitors $C_{LCa}$ and $C_{LCb}$, that is, a pixel voltage. Alignment of the liquid crystal molecules varies according to the intensity of the pixel voltage. Therefore, polarization of light passing through the liquid crystal layer 3 changes. The change in the polarization results in a change in transmittance of the light due to the polarizing plates 12 and 22 attached to the display panels 100 and 200 (FIGS. 5 and 6).

Figure 7:
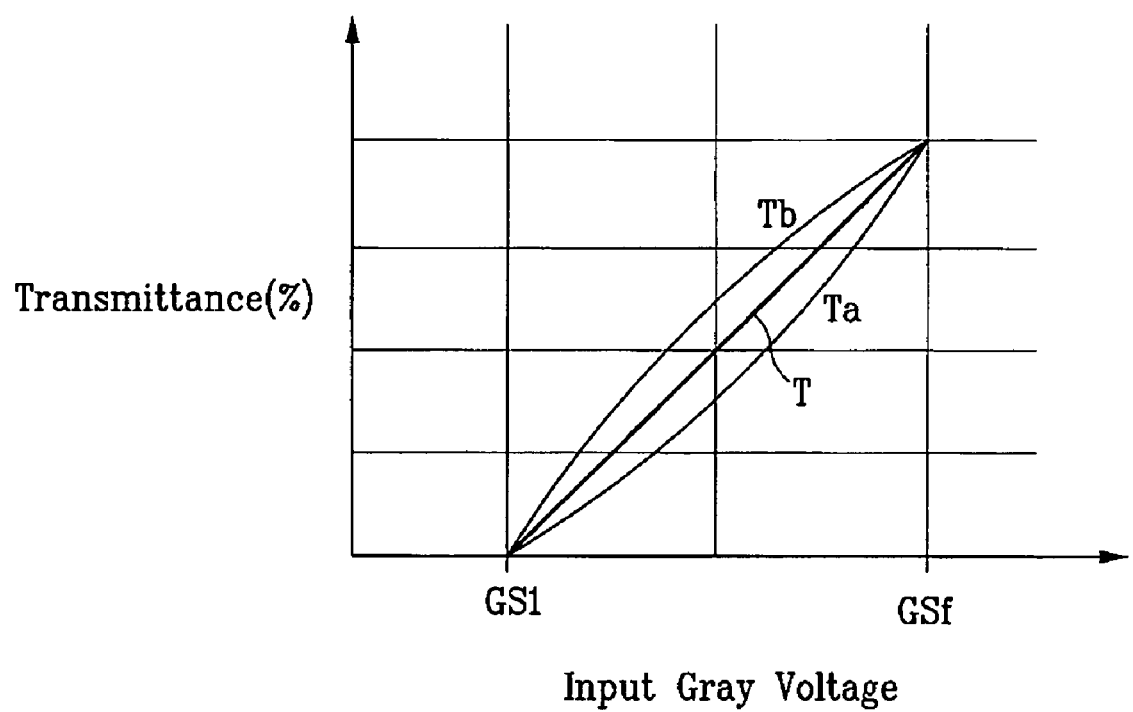
FIG. 7 is a graph showing a gamma curve of an exemplary embodiment of a liquid crystal display apparatus according to the present invention.

As shown in FIG. 7, the two above-described gray voltage sets represent different gamma curves Ta and Tb. The two above-described gray voltage sets are applied to the two sub-pixels PXa and PXb of one pixel PX, so that the gamma curve of the one pixel PX is a composite curve T of the gamma curves. In the determination of the two gray voltage sets, the composite gamma curve T is determined to be close to the reference gamma curve for the front surface. For example, the composite gamma curve T for the front surface is determined to be equal to the reference gamma curve for the front surface, which is most suitable, and the composite gamma curve T for the side surface is determined to be closest to the reference gamma curve for the front surface. If the gamma curve located at the lower side is formed to be lower in a low grayscale, it is possible to further improve side visibility.

In order to facilitate charging, the voltages applied to the first sub-pixel electrodes 190a are set to voltages that are lower than the voltages applied to the second sub-pixel electrodes 190b. The time intervals for applying the gate-on voltages to the two gate lines 121a and 121b are designed to partially overlap each other so as to increase charging time.

In units of one horizontal period (or 1 H), which is one period of the vertical synchronization signal Hsync and the gate clock CPV, the data driver 500 and the gate drivers 400a and 400b repeatedly perform the aforementioned operations. In this manner, during one frame, the gate-on voltage $V_{on}$ is sequentially applied to all of the gate lines $G_1$ to $G_{nb}$ applying the data voltages to all the pixels. When one frame ends, the next frame starts, and a state of the reverse signal RVS applied to the data driver 500 is controlled. In this manner the polarity of the data signal applied to each of the pixels is opposite to the polarity in the previous frame (e.g., frame inversion). At this time, even in one frame, according to the characteristics of the reverse signals RVS, the polarities of the data voltages flowing through the data lines may be inverted (e.g., row inversion and dot inversion), and the polarities of the data voltages simultaneously flowing through the data lines may be different from each other (e.g., column inversion and dot inversion).

Now, another exemplary embodiment of a liquid crystal display apparatus according to the present invention will be described with reference to FIGS. 8 and 9.

Figure 8:
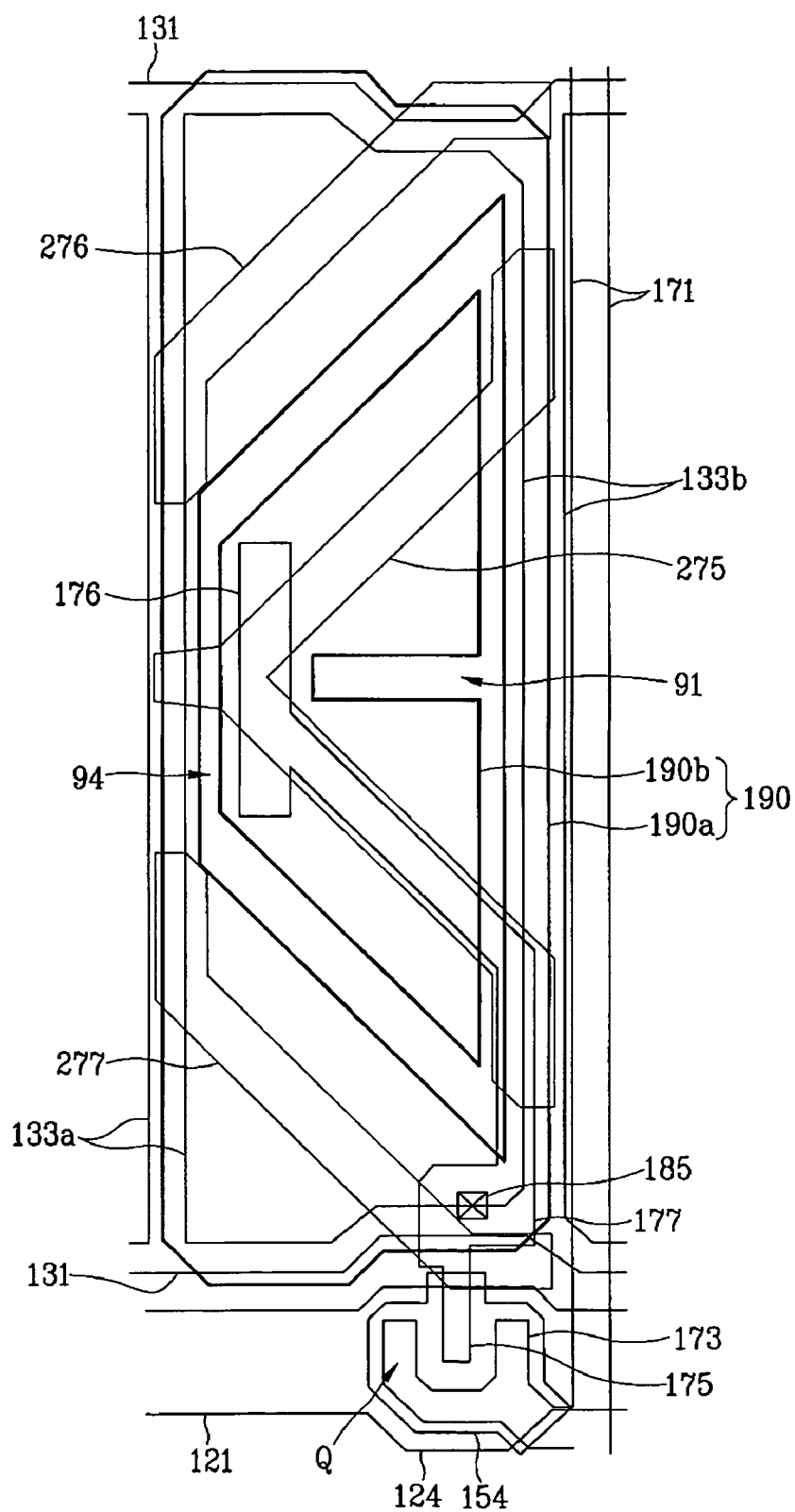
FIG. 8 is a plan view showing another exemplary embodiment of a layout of the liquid crystal display apparatus according to the present invention.

FIG. 8 is a plan view showing another exemplary embodiment layout of the liquid crystal display apparatus according to the present invention. FIG. 9 is an equivalent circuit schematic diagram showing the liquid crystal display apparatus of FIG. 8.

Figure 9:
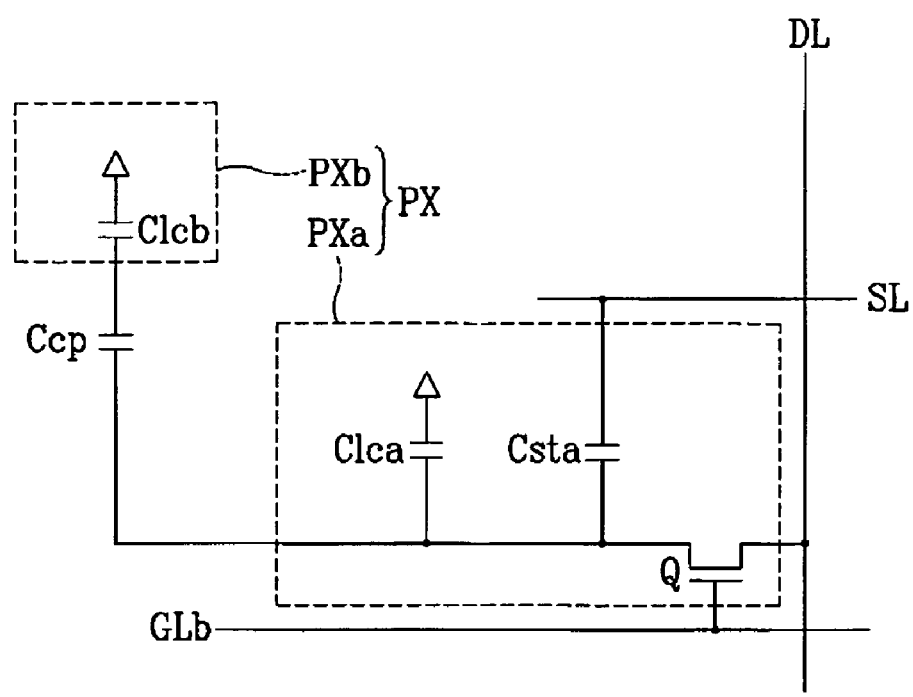
FIG. 9 is an equivalent circuit schematic diagram showing the liquid crystal display apparatus of FIG. 8.

Referring to FIGS. 8 and 9, each pixel PX of the liquid crystal display apparatus according to this alternative embodiment includes a pair of sub-pixels PXa and PXb, and a coupling capacitor Ccp connected therebetween. The sub-pixel PXa includes a switching device Q, a liquid crystal capacitor $C_{LC}a$, and a storage capacitor $C_{ST}a$. The sub-pixel PXb includes only the liquid crystal capacitor $C_{LC}b$, absent a switching device Q.

Referring to FIG. 8, the liquid crystal display apparatus also includes a lower panel, an upper panel facing the lower panel and a liquid crystal layer (not shown) interposed between the lower and upper panels.

The layered structure of the panels according to this alternative embodiment are substantially the same as the layered structure of the panels shown in FIGS. 4 to 6, and thus it is not shown.

In the thin film transistor panel, a plurality of gate lines 121 including gate electrodes 124 and a plurality of storage electrode lines 131 including linear-shaped storage electrodes 133a and 133b are formed on a substrate 110, and a gate insulating layer 140, a plurality of semiconductors 154, and a plurality of island-shaped ohmic contact members (not shown) are sequentially formed thereon. A plurality of data lines 171, including source electrodes 173 and a plurality of drain electrodes 175 are formed on the ohmic contact members, and a protective film 180 is formed thereon. On the protective film 180, a plurality of contact holes 185 are formed. A plurality of the pixel electrodes including sub-pixel electrodes 190a and 190b are formed on the protective film 180, and an alignment film 11 is coated thereon.

In the common electrode panel 200, a light-shielding member (not shown), a plurality of color filters (not shown), a cover film (not shown), a common electrode (not shown) having a plurality of cut portions 275 to 277, and an alignment film (not shown) are formed on a dielectric substrate (not shown).

As shown in FIGS. 8 and 9, the liquid crystal display apparatus includes a single gate line 121 and a single thin film transistor Q, and only the first sub-pixel electrode 190a is connected to the gate line 121 and the data line 171 through the thin film transistor Q. The second sub-pixel electrode 190b overlaps the drain electrode 175 of the thin film transistor to constitute the coupling capacitor Ccp. The second sub-pixel electrode 190b has a voltage induced by capacitive coupling to the first sub-pixel electrode 190a. The induced voltage is lower than a voltage of the first sub-pixel electrode 190a.

More specifically, the gate lines 121 are disposed under the pixel electrodes 190, and the gate lines 121 are provided with the gate electrodes 124 which protrude in the upward and downward directions, as illustrated in FIG. 8. In other words, the gate electrodes 124 have larger width than the gate lines 121. Semiconductors 154 and ohmic contact members are disposed on the gate electrodes 124, and one end of each of the drain electrodes 175 and U-shaped source electrodes 173 is disposed thereon. The drain electrodes 175 include enlarged portions 177 which extend in the upward direction and have a wide width disposed under the first sub-pixel electrodes 190a. Coupling electrodes 176 extend from the enlarged portions 177 under the second sub-pixel electrodes 190b.

Unlike the liquid crystal display apparatus shown in FIG. 4, the first sub-pixel electrodes 190a do not have the central portions having the shape of a trapezoid, and the corresponding regions are filled with the second sub-pixel electrodes 190b to form a shape of an approximate trapezoid. In addition, the first sub-pixel electrodes 190a have linear-shaped connection portions, which are substantially parallel to the bases of the trapezoid of the second sub-pixel electrodes 190b. Therefore, the area of the second sub-pixel electrode 190b is larger than the area of the first sub-pixel electrode 190a. More preferably, the area of the first sub-pixel electrode 190a is about 1.5 times or more the area of the second sub-pixel electrode 190b in order to improve visibility.

The second sub-pixel electrodes 190b are entirely surrounded by the first sub-pixel electrodes 190a and include linear-shaped cut portions extending from the right sides to the left side thereof.

The cut portion set 275 to 277 of the common electrode include a central cut portion 275 and upper and lower cut portions 276 and 277, respectively. The central cut portion 275 includes a pair of slanted portions extending substantially from the center of the left side of the pixel electrode 190 to the right side of the pixel electrode 190 in the slanted or oblique direction and a pair of transverse portions extending from ends of the slanted portions along the right sides of the pixel electrode 190 with an obtuse angle with respect to the slanted portions and overlap with the right side of the pixel electrode 190, as illustrated in FIG. 8. The central cut portion 275 protrudes slightly at the intersection of the two slanted portions in the left direction.

The storage electrode line 131 includes a pair of stem portions which entirely overlap lower and upper sides of the pixel electrode 190. The storage electrodes 133a and 133b are connected to both of the stem portions. The first sub-pixel electrode 190a overlaps both of the storage electrodes 133a and 133b. Particularly, the left and right sides of the first sub-pixel electrode 190a are disposed on the storage electrodes 133a and 133b, respectively. The second sub-pixel electrode 190b is designed not to overlap the storage electrode line 131.

The semiconductors 154 are disposed along the boundary lines defining the gate electrodes 124 and cover the source electrodes 173 and drain electrodes 175, so that the source electrodes 173 and the drain electrodes 175 are not disconnected.

As described above, in the exemplary embodiments of the present invention, it is preferable that the area of the sub-pixel electrodes having low voltages applied thereto are larger than the area of the sub-pixel electrodes applied having high voltages applied thereto in order to improve visibility.

According to exemplary embodiments of the present invention, storage electrodes disposed at both ends of one sub-pixel overlap each other, and another sub-pixel electrode is disposed therein, thus making it possible to maintain storage capacitances of the sub-pixels with uniform values.

Although the exemplary embodiments and the modified examples of the present invention have been described, the present invention is not limited to the above-described embodiments and examples, but may be modified in various forms without departing from the scope of the appended claims, the detailed description, and the accompanying drawings of the present invention. Therefore, it is natural that such modifications belong within the scope of the present invention.

What is claimed is:

1. A liquid crystal display apparatus comprising:
a plurality of pixel electrodes arrayed in a matrix, each pixel electrode of the plurality of pixel electrodes having first and second sub-pixel electrodes;
a plurality of first switching devices connected to the first sub-pixel electrodes;
a plurality of gate lines connected to the first switching devices;
a plurality of data lines connected to the first switching devices and passing between the pixel electrodes to transmit data voltages; and
first and second storage electrodes disposed between the pixel electrodes and the data lines; the first and second storage electrodes being disposed at both sides of the data lines and are separated from the data lines without overlapping them; and the first and second storage electrodes overlapping the first sub-pixel electrodes and neither the first nor second storage electrodes overlapping any portion of the second sub-pixel electrodes.

2. The liquid crystal display apparatus of claim 1, wherein the first sub-pixel electrodes have first and second boundary lines disposed on the first and second storage electrodes.

3. The liquid crystal display apparatus of claim 1, wherein the second sub-pixel electrodes are surrounded by the first sub-pixel electrodes.

4. The liquid crystal display apparatus of claim 1, further comprising third storage electrodes overlapping the second sub-pixel electrodes and not overlapping the first sub-pixel electrodes.

5. The liquid crystal display apparatus of claim 4, further comprising conductive members that are connected to the second sub-pixel electrodes and overlapping the third storage electrodes.

6. The liquid crystal display apparatus of claim 5, wherein the conductive members have a pair of boundary lines that are disposed on the third storage electrodes and facing each other.

7. The liquid crystal display apparatus of claim 1, further comprising second switching devices connected to the second sub-pixel electrodes, the gate lines and the data lines,
wherein a magnitude of the data voltages applied to the first and second sub-pixel electrodes of each of the pixels are different from each other and are obtained from the same image information.

8. The liquid crystal display apparatus of claim 7, wherein the magnitude of the data voltages applied to the second sub-pixel electrodes is larger than a magnitude of the data voltages applied to the first sub-pixel electrodes with respect to a predetermined gray.

9. The liquid crystal display apparatus of claim 8, wherein the data voltages are applied to the second sub-pixel electrodes after the data voltages to the first sub-pixel electrodes have been applied and terminated.

10. The liquid crystal display apparatus of claim 8, wherein an area of each of the first sub-pixel electrodes is larger than an area of each of the second sub-pixel electrodes.

11. The liquid crystal display apparatus of claim 8, further comprising third storage electrodes overlapping the second sub-pixel electrodes and not overlapping the first sub-pixel electrodes.

12. The liquid crystal display apparatus of claim 11,
wherein the second switching devices have gate electrodes connected to the gate lines, source electrodes connected to the data lines and drain electrodes connected to the second sub-pixel electrodes,
wherein the drain electrodes have enlarged portions overlapping the third storage electrodes, and
a distance between the enlarged portions and the third storage electrodes is smaller than a distance between the enlarged portions and the second sub-pixel electrodes.

13. The liquid crystal display apparatus of claim 12, wherein the enlarged portions of the drain electrodes have a pair of boundary lines disposed on the third storage electrodes and facing each other.

14. The liquid crystal display apparatus of claim 1, wherein the first and second sub-pixel electrodes are capacitively coupled to each other.

15. The liquid crystal display apparatus of claim 14,
wherein the first switching devices have the gate electrodes connected to the gate lines, source electrodes connected to the data lines and drain electrodes connected to the first sub-pixel electrodes, and
wherein the drain electrodes have coupling electrodes overlapping the second sub-pixel electrodes.

16. The liquid crystal display apparatus of claim 14, wherein induced voltages at the second sub-pixel electrodes due to the capacitive coupling are lower than the voltages of the first sub-pixel electrodes with respect to a predetermined voltage.

17. The liquid crystal display apparatus of claim 16, wherein an area of each of the second sub-pixel electrodes is larger than an area of each of the first sub-pixel electrodes.

18. The liquid crystal display apparatus of claim 1, wherein neither the first nor second sub-pixel electrodes overlap the gate line connected thereto.

* * * * *